(12) United States Patent
Nguyen et al.

(10) Patent No.: US 11,309,965 B2
(45) Date of Patent: Apr. 19, 2022

(54) EFFICIENTLY COMBINING MULTIPLE TAPS OF AN OPTICAL FILTER

(71) Applicant: GenXComm, Inc., Austin, TX (US)

(72) Inventors: Thien-An Nguyen, Austin, TX (US); Monireh Moayedi Pour Fard, Austin, TX (US); Farzad Mokhtari Koushyar, Austin, TX (US); McKay Bradford, Leander, TX (US); Ke Liu, Austin, TX (US)

(73) Assignee: GenXComm, Inc., Austin, TX (US)

( * ) Notice: Subject to any disclaimer, the term of this patent is extended or adjusted under 35 U.S.C. 154(b) by 0 days.

(21) Appl. No.: 16/931,312

(22) Filed: Jul. 16, 2020

(65) Prior Publication Data

US 2021/0036779 A1  Feb. 4, 2021

Related U.S. Application Data

(63) Continuation of application No. 16/511,715, filed on Jul. 15, 2019, now Pat. No. 10,727,945.

(51) Int. Cl.
*H04B 10/2575* (2013.01)
*H04B 10/2507* (2013.01)
*H04B 10/69* (2013.01)

(52) U.S. Cl.
CPC ... *H04B 10/25752* (2013.01); *H04B 10/2507* (2013.01); *H04B 10/6972* (2013.01)

(58) Field of Classification Search
CPC combination set(s) only.
See application file for complete search history.

(56) References Cited

U.S. PATENT DOCUMENTS

| 4,608,569 A | 8/1986 | Dickey, Jr. et al. |
| 5,377,289 A * | 12/1994 | Johnson ............ G02B 6/264 385/136 |

(Continued)

FOREIGN PATENT DOCUMENTS

| CN | 101379718 | 3/2009 |
| CN | 104484852 | 4/2015 |

(Continued)

OTHER PUBLICATIONS

International Search Report and Written Opinion dated Oct. 7, 2020, PCT/US2020/041263, 17 pages.

(Continued)

*Primary Examiner* — Omar S Ismail
(74) *Attorney, Agent, or Firm* — Brownstein Hyatt Farber Schreck, LLP

(57) ABSTRACT

An optical filter comprises an array of waveguides fabricated on an optical integrated circuit (PIC). The array comprises individual waveguides, each of which receive light inputs, e.g., individual taps of a multi-tap optical filter used in an interference cancellation circuit. Typically, the output(s) of the individual waveguides are located at an exit (edge) of the PIC. At least one second waveguide in the array is patterned on the PIC in a converged configuration such that the light transiting these waveguides co-propagates and interacts across given portions of the respective waveguides before exiting the waveguide array along a common facet, thereby generating or inhibiting one of intermodulation products, and harmonics. This structural configuration enables the generation of various modes of transmission at the PIC exit, enabling more efficient transfer of the energy, e.g., to an associated photodetector (PD) that provides conversion of the energy to the RF domain.

18 Claims, 13 Drawing Sheets

(56) References Cited

U.S. PATENT DOCUMENTS

| | | | |
|---|---|---|---|
| 5,444,864 | A * | 8/1995 | Smith .................... H04B 1/408 |
| | | | 455/24 |
| 5,699,176 | A | 12/1997 | Cohen |
| 5,701,371 | A * | 12/1997 | Ishida ................ G02B 6/12019 |
| | | | 385/16 |
| RE35,736 | E | 2/1998 | Powell |
| 5,757,312 | A | 5/1998 | Szmurlo |
| 5,867,293 | A | 2/1999 | Kotten |
| 5,904,546 | A | 5/1999 | Wood et al. |
| 6,359,714 | B1 | 3/2002 | Imajo |
| 6,373,909 | B2 | 4/2002 | Lindquist |
| 6,507,728 | B1 | 1/2003 | Watanabe |
| 6,539,204 | B1 | 3/2003 | Marsh |
| 6,567,648 | B1 | 5/2003 | Ahn |
| 6,567,649 | B2 | 5/2003 | Souissi |
| 6,745,018 | B1 | 6/2004 | Zehavi |
| 6,751,447 | B1 | 6/2004 | Jin |
| 6,760,454 | B1 | 7/2004 | Shreve |
| 6,771,931 | B2 | 8/2004 | Waltho |
| 6,907,093 | B2 | 6/2005 | Blount |
| 7,058,368 | B2 | 6/2006 | Nicholls |
| 7,064,697 | B2 | 6/2006 | Taylor et al. |
| 7,085,497 | B2 | 8/2006 | Tiemann |
| 7,116,484 | B2 * | 10/2006 | Nemoto ................. G02B 5/005 |
| | | | 359/626 |
| 7,123,676 | B2 | 10/2006 | Gebara |
| 7,130,289 | B2 | 10/2006 | Kuan et al. |
| 7,355,993 | B2 | 4/2008 | Adkins |
| 7,366,244 | B2 | 4/2008 | Gebara |
| 7,509,054 | B2 | 3/2009 | Calabro et al. |
| 7,566,634 | B2 | 7/2009 | Beyne et al. |
| 7,650,080 | B2 | 1/2010 | Yap |
| 7,660,531 | B2 | 2/2010 | Lee |
| 7,672,643 | B2 | 3/2010 | Loh |
| 7,711,329 | B2 | 5/2010 | Aparin |
| 7,720,029 | B2 | 5/2010 | Orava |
| 7,729,431 | B2 | 6/2010 | Gebara |
| 7,756,480 | B2 | 7/2010 | Loh |
| 7,809,047 | B2 | 10/2010 | Kummetz |
| 7,826,808 | B2 | 11/2010 | Faulkner |
| 7,853,195 | B2 | 12/2010 | Higgins |
| 7,869,527 | B2 | 1/2011 | Vetter |
| 7,876,867 | B2 | 1/2011 | Filipovic |
| 7,907,895 | B2 | 3/2011 | Shinagawa |
| 7,917,177 | B2 | 3/2011 | Bauman |
| 8,036,606 | B2 | 10/2011 | Kenington |
| 8,055,235 | B1 | 11/2011 | Gupta et al. |
| 8,078,130 | B2 | 12/2011 | Fudge |
| 8,081,946 | B2 | 12/2011 | Fudge |
| 8,155,605 | B2 | 4/2012 | Hwang |
| 8,170,487 | B2 | 5/2012 | Sahota et al. |
| 8,233,872 | B2 | 7/2012 | Nagai |
| 8,249,540 | B1 | 8/2012 | Gupta |
| 8,270,843 | B2 | 9/2012 | Nakamoto |
| 8,320,504 | B2 | 11/2012 | Peng |
| 8,331,509 | B2 | 12/2012 | Wang |
| 8,351,874 | B2 | 1/2013 | Dent |
| 8,477,871 | B2 | 7/2013 | Neumann |
| 8,521,090 | B2 | 8/2013 | Kim |
| 8,526,903 | B2 | 9/2013 | Gudem |
| 8,565,681 | B2 | 10/2013 | Kim |
| 8,600,200 | B1 | 12/2013 | Rakich et al. |
| 8,682,170 | B2 | 3/2014 | Prucnal |
| 8,730,786 | B2 | 5/2014 | Wang |
| 8,781,030 | B2 | 7/2014 | Peng |
| 8,785,332 | B2 | 7/2014 | Johnson et al. |
| 8,805,298 | B2 | 8/2014 | McCallister |
| 8,845,854 | B2 | 9/2014 | Lei et al. |
| 8,872,583 | B2 | 10/2014 | Lee |
| 8,971,712 | B2 | 3/2015 | Fan et al. |
| 8,977,223 | B1 | 3/2015 | Gupta |
| 9,100,099 | B2 | 8/2015 | Loh |
| 9,106,453 | B2 | 8/2015 | Wang |
| 9,178,635 | B2 | 11/2015 | Ben-Shlomo |
| 9,184,902 | B2 | 11/2015 | Khojastepour |
| 9,195,052 | B2 | 11/2015 | Long |
| 9,214,718 | B2 | 12/2015 | Mow |
| 9,224,650 | B2 | 12/2015 | Lei et al. |
| 9,252,857 | B2 | 2/2016 | Negus |
| 9,253,003 | B1 | 2/2016 | Harel |
| 9,257,811 | B2 | 2/2016 | Gao |
| 9,258,052 | B2 | 2/2016 | George |
| 9,268,092 | B1 | 2/2016 | Jarecki, Jr |
| 9,344,125 | B2 | 5/2016 | Kpodzo |
| 9,344,139 | B2 | 5/2016 | Sjoland |
| 9,385,268 | B2 | 7/2016 | Minamiru et al. |
| 9,391,667 | B2 | 7/2016 | Sundstrom |
| 9,438,288 | B2 | 9/2016 | Feld |
| 9,450,623 | B2 | 9/2016 | Weissman |
| 9,490,963 | B2 | 11/2016 | Choi |
| 9,520,985 | B2 | 12/2016 | Choi |
| 9,571,205 | B1 | 2/2017 | Suarez |
| 9,589,812 | B2 | 3/2017 | Takahashi et al. |
| 9,602,149 | B1 | 3/2017 | Tanzi |
| 9,608,718 | B2 | 3/2017 | Monsen |
| 9,651,652 | B2 | 5/2017 | Kpodzo et al. |
| 9,667,404 | B2 | 5/2017 | Sjoland |
| 9,696,492 | B1 | 7/2017 | Cox |
| 9,703,056 | B2 | 7/2017 | Neelakantan et al. |
| 9,712,233 | B1 | 7/2017 | Deng |
| 9,722,713 | B2 | 8/2017 | Tanzi |
| 9,723,612 | B2 | 8/2017 | Stapleton |
| 9,726,821 | B2 | 8/2017 | Murray et al. |
| 9,735,056 | B2 | 8/2017 | Takahashi et al. |
| 9,748,906 | B2 | 8/2017 | Stewart |
| 9,768,852 | B2 | 9/2017 | Ling |
| 9,774,364 | B2 | 9/2017 | Shih |
| 9,775,123 | B2 | 9/2017 | Harel |
| 9,793,943 | B2 | 10/2017 | Sjoland |
| 9,793,992 | B2 | 10/2017 | Hino |
| 9,807,700 | B2 | 10/2017 | Harel |
| 9,847,258 | B2 | 12/2017 | Rohleder et al. |
| 9,871,552 | B2 | 1/2018 | Din |
| 9,885,806 | B2 | 2/2018 | Steinhardt |
| 9,900,044 | B2 | 2/2018 | Sjoland |
| 9,923,593 | B2 | 3/2018 | Andersson |
| 9,923,708 | B2 | 3/2018 | Khandani |
| 9,960,805 | B2 | 5/2018 | Wyville |
| 9,960,850 | B2 | 5/2018 | Daniel |
| 9,997,363 | B2 | 6/2018 | Ono et al. |
| 10,009,120 | B2 | 6/2018 | Ranson |
| 10,027,465 | B2 | 7/2018 | Sjoland |
| 10,031,246 | B2 | 7/2018 | Zhou |
| 10,038,471 | B2 | 7/2018 | Chang |
| 10,084,506 | B2 | 9/2018 | Sjoland |
| 10,110,306 | B2 | 10/2018 | Jain et al. |
| 10,177,836 | B2 | 1/2019 | Hong |
| 10,191,217 | B2 * | 1/2019 | Boutami ................ G02B 6/305 |
| 10,257,746 | B2 | 4/2019 | Jain et al. |
| 10,321,357 | B1 | 6/2019 | Jain et al. |
| 10,325,861 | B2 | 6/2019 | Miccoli |
| 10,356,782 | B2 | 7/2019 | Negus |
| 10,367,584 | B2 | 7/2019 | Rakich |
| 10,418,775 | B2 | 9/2019 | Gao |
| 10,491,313 | B2 | 11/2019 | Jain |
| 10,663,663 | B2 | 5/2020 | Painchaud |
| 10,673,519 | B2 | 6/2020 | Hong |
| 10,727,945 | B1 | 7/2020 | Nguyen et al. |
| 10,754,091 | B1 | 8/2020 | Nagarajan |
| 10,873,877 | B2 | 12/2020 | Jain et al. |
| 11,032,005 | B2 | 6/2021 | Vishwanath et al. |
| 11,032,737 | B2 | 6/2021 | Jain et al. |
| 2002/0105997 | A1 * | 8/2002 | Zhang .................... H01S 3/109 |
| | | | 372/70 |
| 2003/0048524 | A1 | 3/2003 | Chavez-Pirson |
| 2003/0161637 | A1 | 8/2003 | Yamamoto |
| 2003/0202794 | A1 | 10/2003 | Izadpanah |
| 2004/0151238 | A1 | 8/2004 | Masenten |
| 2004/0247221 | A1 * | 12/2004 | Tsarev ............... G02B 6/12007 |
| | | | 385/3 |
| 2004/0264610 | A1 | 12/2004 | Marro |
| 2005/0285541 | A1 | 12/2005 | LeChevalier |
| 2008/0013881 | A1 * | 1/2008 | Welch ................ G02B 6/12023 |
| | | | 385/14 |

(56) References Cited

U.S. PATENT DOCUMENTS

| | | |
|---|---|---|
| 2008/0112053 A1 | 5/2008 | Levner et al. |
| 2011/0065408 A1 | 3/2011 | Kenington et al. |
| 2011/0065409 A1 | 3/2011 | Kenington |
| 2011/0115040 A1* | 5/2011 | Su .................. G02B 6/1228 257/432 |
| 2011/0280582 A1 | 11/2011 | Piehler et al. |
| 2012/0212360 A1 | 8/2012 | Kanter et al. |
| 2012/0251041 A1 | 10/2012 | Ishikawa et al. |
| 2013/0295980 A1 | 11/2013 | Reuven |
| 2014/0169236 A1 | 6/2014 | Choi |
| 2015/0358086 A1 | 12/2015 | Foster et al. |
| 2016/0103341 A1 | 4/2016 | Long |
| 2017/0141853 A1 | 5/2017 | Welch et al. |
| 2017/0176780 A1* | 6/2017 | Levy ............... G02B 6/29338 |
| 2017/0250758 A1 | 8/2017 | Kikuchi et al. |
| 2017/0299806 A1 | 10/2017 | Kopp et al. |
| 2018/0006795 A1 | 1/2018 | Raaf |
| 2018/0219633 A1* | 8/2018 | Kanter ............... H04B 10/2575 |
| 2018/0248627 A1 | 8/2018 | Daniel |
| 2019/0086620 A1* | 3/2019 | Chen .................. G02B 6/42 |
| 2020/0209476 A1 | 7/2020 | Mattis et al. |
| 2021/0088724 A1 | 3/2021 | Liu et al. |
| 2021/0126669 A1 | 4/2021 | Roberts et al. |
| 2021/0153073 A1 | 5/2021 | Hain et al. |
| 2021/0297156 A1 | 9/2021 | Jain et al. |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2006301415 | 11/2006 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

Chang et al., "Full-duplex spectrum sensing in cognitive radios using optical self-interference cancellation," 2015 9th International Conference on Sensing Technology (ICST), IEEE, pp. 341-344, Dec. 8, 2015.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Mothe et al., "Multichannel Microwave Photonics Signals Summation Device," IEEE Photonics Technology Letters, vol. 23, No. 3, pp. 140-142, Feb. 1, 2011.

Tartaret-Josni'ere et al., "Microwave Photonics Summation Device With up to 19 Input Signals in K and Ku Bands," Journal of Lightwave Technology, vol. 34, No. 20, pp. 4715-4721, Oct. 15, 2016.

Author Unknown, "Silicon Nanophotonic Packaging," IBM, https://researcher.watson.IBM.com/researcher/view_ group_subpage.php?id+5522, Jul. 2016.

Li et al., "Multimode silicon photonics," Nanophotonics, vol. 8, No. 2, pp. 227-247, May 16, 2019.

Yoo et al., "Heterogeneous 2D/3D photonic integrated microsystems," Microsystems & Nanoengineering, (2016) 2, 16030, Aug. 2016.

* cited by examiner

EFFICIENTLY COMBINING MULTIPLE TAPS OF AN OPTICAL FILTER

CROSS-REFERENCE TO RELATED APPLICATION

This application is a continuation of, and claims priority under 35 U.S.C. § 119 to U.S. patent application Ser. No. 16/511,715, filed Jul. 15, 2019, and titled "Efficiently Combining Multiple Taps of an Optical Filter," the contents of which are incorporated herein by reference in its entirety.

TECHNICAL FIELD

This application relates generally to photonics and, in particular, to photonic-based optical filtering.

BACKGROUND

Light-enabled technologies enable creation of faster, smaller, lower-powered components for interference-free device connectivity. These technologies replace conventional microelectronics with photonic processors that provide microphotonics-based real time signal processing to enable low interference high-bandwidth communications. Conventional photonic architectures include optical filter assemblies to facilitate interference cancellation. In particular, when implementing optical filters in a photonics integrated circuit (PIC), light is split into multiple paths and manipulated. These multiple paths of light are then combined to obtain a filter output.

However, conventional methods of combining light paths, are large, bulky, or lossy and may be difficult to incorporate into small form factor electronic devices.

BRIEF SUMMARY

An optical element comprises an array of waveguides fabricated on an optical integrated circuit. The array comprises individual waveguides, each of which receive light inputs, e.g., individual taps of a multi-tap optical filter used in an interference cancellation circuit. Each individual waveguide comprises an inlet that receives light, and an outlet. Typically, the output(s) of the individual waveguides are located at an exit (edge) of a photonic integrated circuit (PIC) and, in particular, along a common facet. In one embodiment, at least one second waveguide in the array is fabricated on the PIC in a tapered or "converging" configuration such that, relative to a first waveguide, the light transiting these waveguides co-propagates and interacts across given portions of the respective waveguides before exiting the waveguide array along the common facet, thereby generating or inhibiting one of: intermodulation products, and harmonics. In particular, this structural configuration enables the generation of various useful modes of transmission (e.g., supermode, and multi-mode) at the PIC exit, enabling more efficient transfer of the energy, e.g., to an associated photodetector (PD) that provides conversion of the energy to the RF domain.

The number of waveguides (taps) in the filter structure may vary, as can their shape(s) and relative spacing. In another aspect, the waveguides may be further separated by isolation elements to limit intermodulation products. Further, individual waveguides may include associated phase shifter elements at their leading ends (i.e. their inlets) for further signal-shaping.

The PIC-based optical element may be used in association with any RF component. In one embodiment as mentioned above, the optical filter is used in an interference cancellation circuit. Other applications of the optical element herein include, without limitation, an RF phased array antenna receiver, in an RF mixer, and the like.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
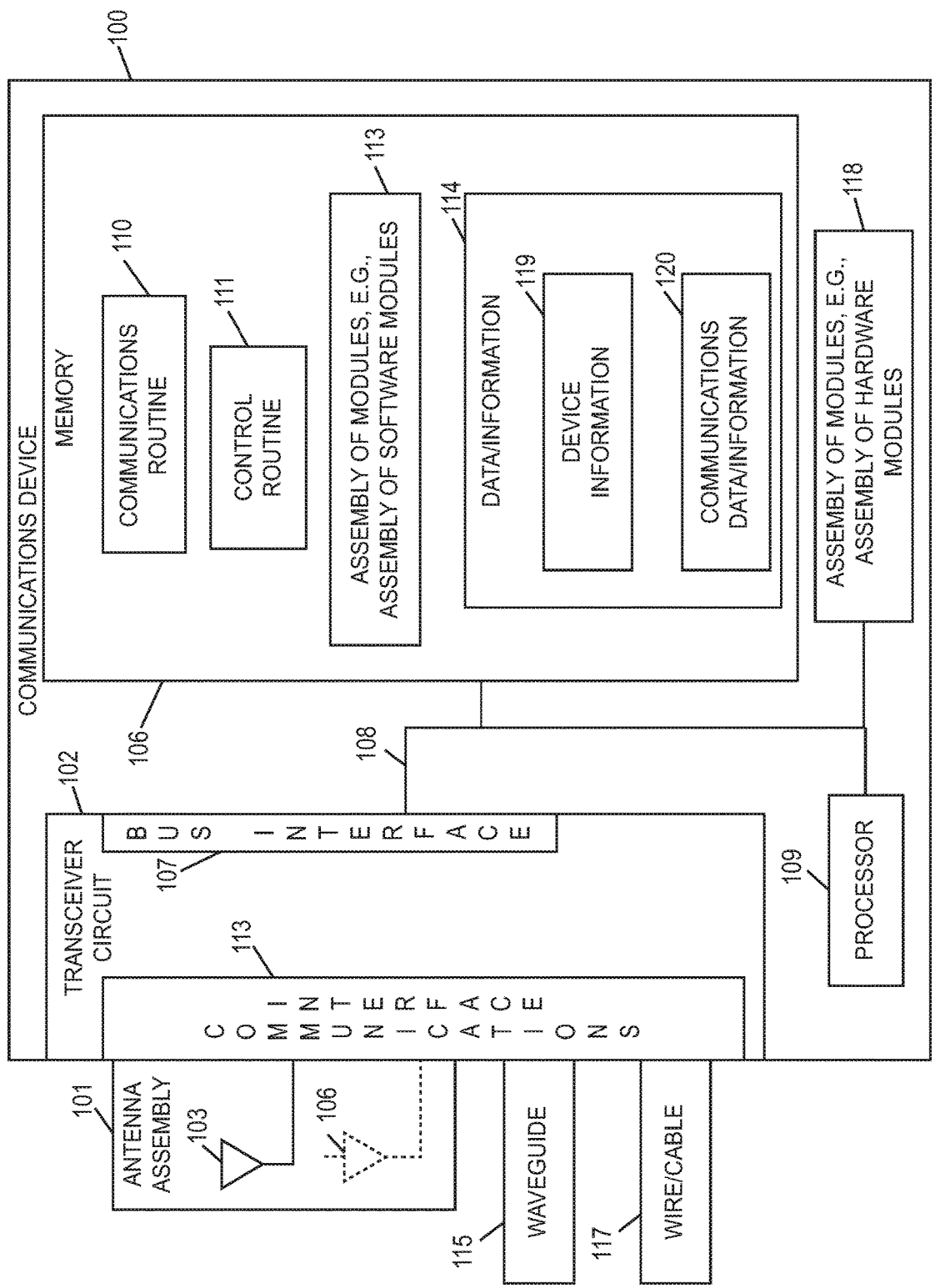
FIG. 1 depicts a communications device that may be configured to use the apparatus of this disclosure.

FIG. 1 depicts a communications device 100 including self-interference cancellation capability, and in which the techniques of this disclosure may be implemented. The communications device 100 includes a transceiver circuit 102, a processor 109, e.g., a central processing unit (CPU), a memory 106, and an assembly of modules 118, e.g., assembly of hardware modules, e.g., circuits, coupled together via a bus 108, over which the various elements 102, 109, 106 may communicate data and information. Memory 106 includes a communications routine 110 configured to control communications operations for the communications device 100 including controlling operation of the transceiver circuit 102, a control routine 111, an assembly of modules 113, e.g., an assembly of software modules, and data/ information 114. Data/information includes device information 119, includes interface information including optical filter component information and antenna information, etc., and communications data/information 120 includes, e.g., RF frequency information, channel type information, channel conditions, determined filter coefficients, received signal information, transmitted signal information, generated radio frequency interference cancellation signal information, etc. In some embodiments, some information stored in memory 106 is also stored in local memory within transceiver circuit 102. In some embodiments, processor 102, e.g., a CPU, executes routines including software modules included in memory 106 to control the communications device 100 to control the transceiver circuit 102 to implement a radio frequency interference cancellation method that includes the use of an optical filter assembly.

Transceiver circuit 102 includes a bus interface 107 and a communications interface 113. Bus interface 107 couples the transceiver circuit to bus 108. Communications interface 113 couples the transceiver circuit 102 to one or more or all of: an antenna assembly 101, a waveguide 115 and a wire/cable 117. In some embodiments, the antenna assembly is included as part of the communications device 100. Antenna assembly 101 includes one or more antennas (103, . . . 106). In some embodiments, antenna assembly 101 includes a single antenna 103 which is used by both the transmitter and receiver of the transceiver circuit 102. In some embodiments, that antenna assembly 101 includes a transmit antenna 103 and a receive antenna 106. In some embodiments, the antenna assembly includes a plurality of transmit antennas and a plurality of receive antennas. In some such embodiments, the antenna assembly 101 and the transceiver circuit 102 support multiple-input multiple-output (MIMO) operations.

Figure 2:
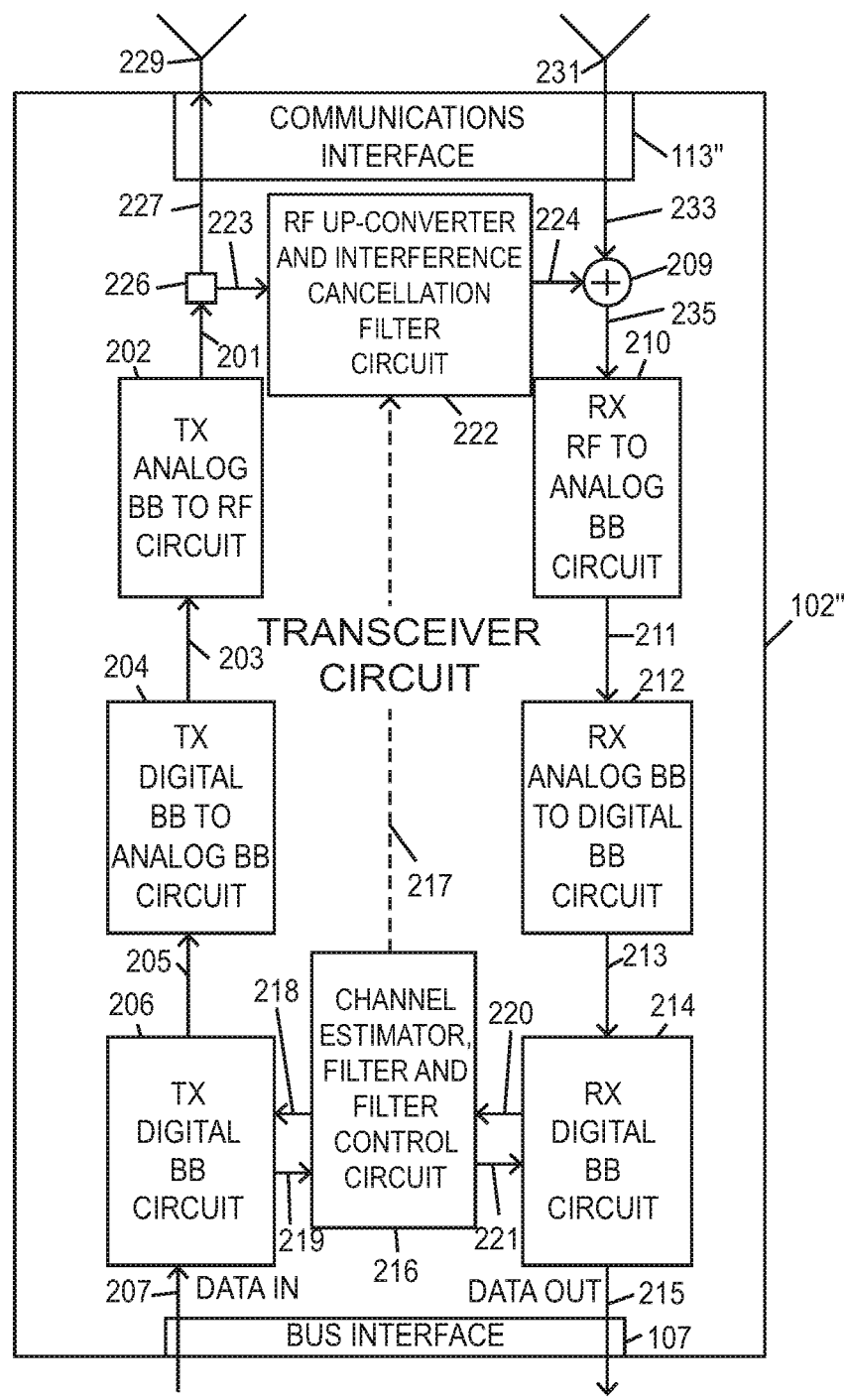
FIG. 2 depicts the transceiver circuit of the communication device of FIG. 1.

FIG. 2 illustrates the transceiver circuit 102 of FIG. 1 Transceiver circuit 102" includes communications interface 113", bus interface 107, transmit (TX) digital baseband (BB) circuit 206, TX digital baseband to analog baseband circuit 204, TX analog baseband to radio frequency (RF) circuit 202, coupler device 226, signal combiner/coupler device 209, RX RF to analog baseband circuit 210, RX analog baseband to digital baseband circuit 212, RX digital baseband circuit 214, RF up-converter and interference cancellation filter circuit 222, and channel estimator, filter, e.g., digital filter, and filter control circuit 216, coupled together as shown. Signal combiner 209 is configured to combine a received radio frequency signal 233 with the radio frequency interference cancellation signal 224 to produce a recovered radio frequency signal 235. In various embodiments, the signal combiner 209 is configured to subtract the radio frequency interference signal 233 from the received radio frequency signal 233 to generate the recovered radio frequency signal 235.

The transceiver circuit 102" comprises of a transmit chain and the receive chain. In the transmit chain, the transmit digital baseband circuit 206 receives, via bus interface 107, input data 207 to be transmitted in the form of bits, converts the bits into a digital baseband waveform 205, which is output to the TX digital baseband to analog baseband circuit 204. The TX digital baseband circuit 206 performs encoding and modulation of the received input data 207. The encoding and modulation performed by TX digital baseband circuit 106 uses, e.g. orthogonal frequency division multiplexing, CDMA, or another encoding and modulation scheme. The TX digital baseband to analog baseband circuit 204, e.g., a filter and digital to analog converter (DAC) assembly, converts the digital signal 205 into analog baseband signal 203, which is output to TX analog baseband to RF circuit 202. Analog baseband signal 203 is received by TX analog baseband to RF circuit 202 and subsequently up-converted to the operating RF frequency using a direct conversion or an intermediate frequency converter included in circuit 202. The up-converted RF signal 201 is the output of a power amplifier included in circuit 202. The up-converted RF signal 201 is coupled or divided using a device 226 where the pass-through signal 227 goes to the communication interface 113" and the tapped signal 223 is fed to the RF up-converter and interference cancellation filter circuit 222. The RF signal 227 in the communication interface 113" passes through to the antenna 229 in case of this realization.

Receive antenna 231 receives a wireless RF signal and outputs received signal 233 into in to interface 113" toward the receive chain. On the receive side of the transceiver circuit 102", the receive signal 233 from the communication interface 113" feeds in to a coupler or combiner 209 which is 3 port device. Coupler or combiner 209 is responsible for combining input signal 224, which is an output of the RF-up converter and interference cancellation filter circuit 222, and input signal 233, which is the signal received via receive antenna 213, to generate output RF signal 235. The output RF signal 235 is fed into the RX RF to analog baseband circuit, 210, which is an RF down-converter, that down-converts the RF signal 235 into a baseband analog signal 211. This baseband analog signal 211 is received, filtered and sampled by RX analog baseband to digital baseband circuit 212, which generates and outputs sampled output signal 213. The sampled output signal 213 is fed into the RX digital baseband circuit 214 including a digital receive processor that is responsible for demodulation and decoding.

RF Signal 223, a copy of the transmit signal 201, is fed into the RF up-converter and interference cancellation filter circuit 222. RF up-converter and interference cancellation filter circuit 222 produces signal 224, which is a negative copy or near negative copy of the interference signal received as a component of receive signal 233, the interference signal being an effect of transmission of signal 227. The combining of the negative copy 224 with the received signal 233 using a combiner/coupler device 209 results in cancellation of interference that is caused by the transmitter of transceiver circuit 102" at the receiver of transceiver circuit 102".

Channel estimator, filter and filter control circuit 216 interfaces with the digital processing block of transmit digital baseband circuit 206 and with the digital processing block of receive digital baseband circuit 214. The channel estimator, filter, and filter control circuit 216 is responsible for reconstruction of a residual interference signal that is observed at the sampled signal 220 in the RX digital baseband circuit 214. In particular, the channel estimator, filter and filter control circuit 216 is responsible for the measurement and training of a digital filter included in circuit 216 and the RF cancellation filter included in circuit 222. To this end, channel estimator, filter, and filter control circuit 216 uses input signal 219, a copy of the digital transmit signal, and received sampled signal 220 to determine the effect of the transceiver circuit 102" and antennas (229, 231), determine the channel that causes interference, and determine the appropriate coefficients to be programmed to the RF interference cancellation filter included in circuit 222. The determined appropriate coefficients are communicated in signal 217 from channel estimator, filter and filter control circuit 216 to RF up-converter and interference cancellation filter circuit 222. Channel estimator, filter and filter control circuit 216 also recreates a negative copy 221 of the interference signal, which it sends to RX digital baseband circuit 214 to be subtracted from the received signal 213. RX digital baseband circuit 214 receives the recreated negative copy 221 of the interference signal and subtracts the recreated negative copy 221 of the interference signal from received signal 213, as part of its processing. Circuit 214 further generates digital data out signal 215 and outputs digital data out signal via interface 107.

Figure 3:
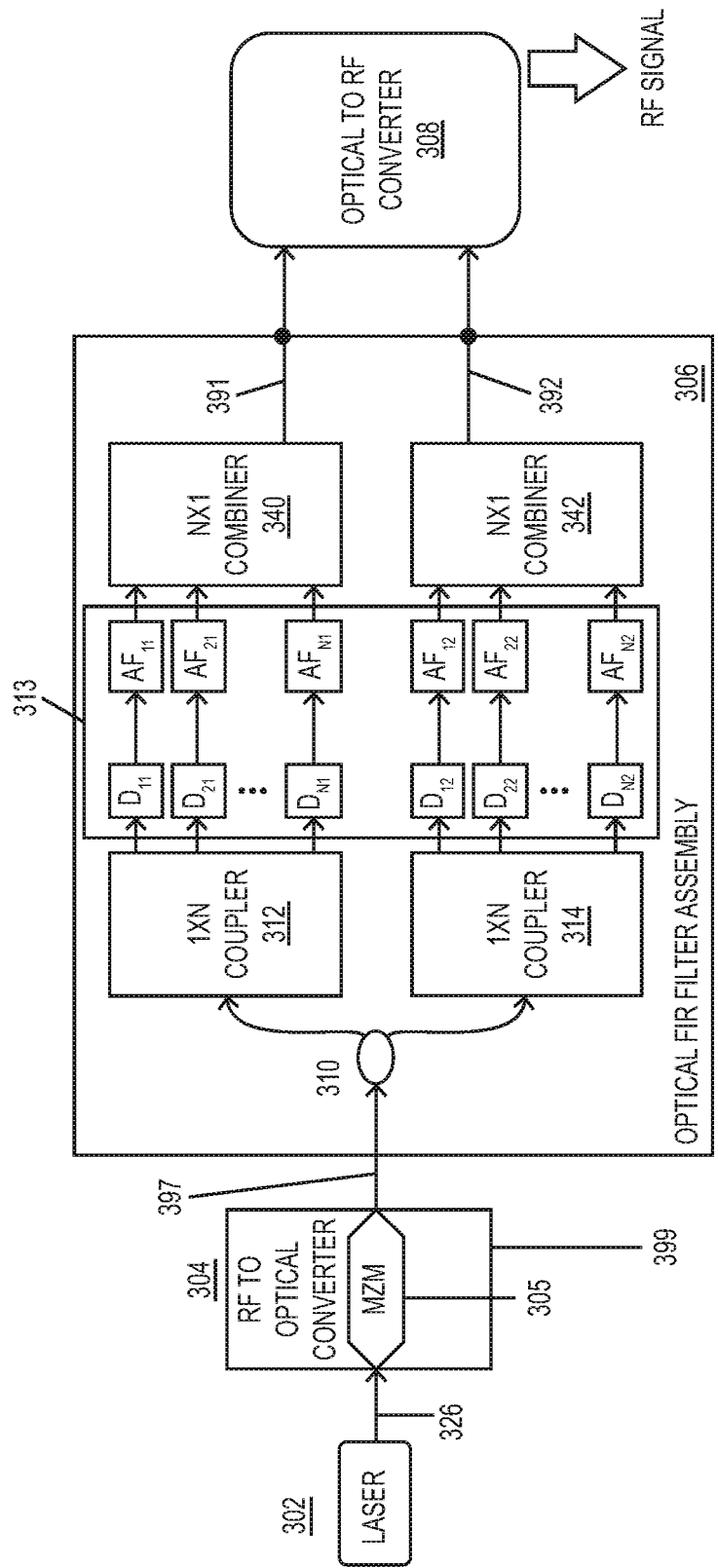
FIG. 3 depicts the RF up-converter and interference cancellation filter circuit in the transceiver circuit of FIG. 2.

FIG. 3 depicts a simplified representation of an RF up-converter and interference cancellation filter circuit 222 of FIG. 2. RF up-converter and interference cancellation filter circuit 222" includes a laser 302, an RF signal-to-optical signal converter 304 including a Mach-Zehnder modulator (MZM) 305, an optical filter assembly 306, and an optical-to-RF converter 308, e.g., a balanced photodetector, coupled together as shown. In a variant embodiment, laser 302 and RF-to-optical converter 304 are replaced by a directly modulated laser (DML). Radio frequency signal-to-optical signal converter 304 has a radio frequency input 399 configured to receive a radio frequency signal, and an optical output 397 for outputting a first optical signal generated from the radio frequency signal to be communicated. Optical filter assembly 306 filters the first optical signal. Optical to radio frequency converter 306 is coupled to an output of the optical filter assembly 306. The optical to radio frequency converter 306 is configured to generate a radio frequency interference cancellation signal from optical signals output by the optical filter assembly 306. In various embodiments, and as mentioned, the optical to radio frequency converter 306 is a balanced photodetector, and the optical to radio frequency converter 306 generates the radio interference signal from an optical signal 391 and an optical signal 392 output from the optical filter assembly 306.

Optical filter assembly 306 typically includes an optical IIR filter assembly (not shown), an optical FIR filter assembly 313, a filter controller (not shown), a 1 to 2 optical coupler 310, two (2) 1 to N optical couplers (312, 314) and two (2) N to 1 optical couplers (340, 342) coupled together as shown in FIG. 3. As will be described, the optical FIR filter assembly 313 typically includes a plurality of optical FIR filters, each optical FIR filter including a controllable optical delay element, e.g., a delay device, and a controllable gain element.

Laser 302 generates and outputs optical signal 326, which is sent to RF to optical converter 304, which receives that optical signal. The RF-to-optical converter also 304 receives an input RF signal on radio frequency input 399 and generates output optical signal 328, which is output on optical output 397. The optical signal is provided as an input to the optical filter assembly 306. This optical signal is processed by the optical IIR filter assembly, which generates and outputs an optical signal. The optical IIR filter assembly subjects the input optical signal to delays in accordance with the fixed delays corresponding to the FRRs, and to gain adjustments in accordance with the controlled gain adjustments in accordance with the controlled gain settings of gain control elements, thereby generating an optical output signal. The optical signal output from the optical IIR filter assembly is input to the coupler 310, e.g., a 1 to 2 splitter, which generates first and second optical signals. The first optical signal is input to the 1×N coupler (splitter) 312, which outputs optical signals to the input(s) of controllable delay devices (D11, D21, . . . DN1), respectively. The second optical signal is input to the 1×N coupler (splitter) 314, which outputs optical signals to the input(s) of controllable delay devices (D12, D22, . . . , DN2), respectively. The optical delay devices introduce variable delays corresponding to the controlled delay settings supplied by the filter controller, generating optical signals that are then supplied as inputs(s) to controllable gain elements (AF11, AF21, . . . , AFN1, AF12, AF22, . . . , AFN2), respectively. The controllable gain elements adjust gains corresponding to the controlled gains settings based on the filter control signals supplied by the filter controller, thereby generating resulting optical signals. Some of these optical signals are input to N×1 optical coupler (combiner) 340, which combines the signals and outputs an optical signal. The remaining optical signals are input to N×1 optical coupler (combiner) 342, which combines the signals and outputs another optical signal. These optical signals output from the optical filter assembly 306 couple the optical filter assembly 306 to the optical-to-RF converter 304, in this embodiment the balanced photodetector. Optical-to-RF converter 306 receives the optical signals and generates and outputs an RF signal.

Thus, in the embodiment shown in FIG. 3, the RF signal is up-converted and modulated onto an optical carrier, and the RF optical signal is split into n taps, each of which goes thru a variable delay and gain/attenuation stage. The taps are combined resulting in a filtered signal, which is converted back to RF using a photodiode (PD).

Figure 4:
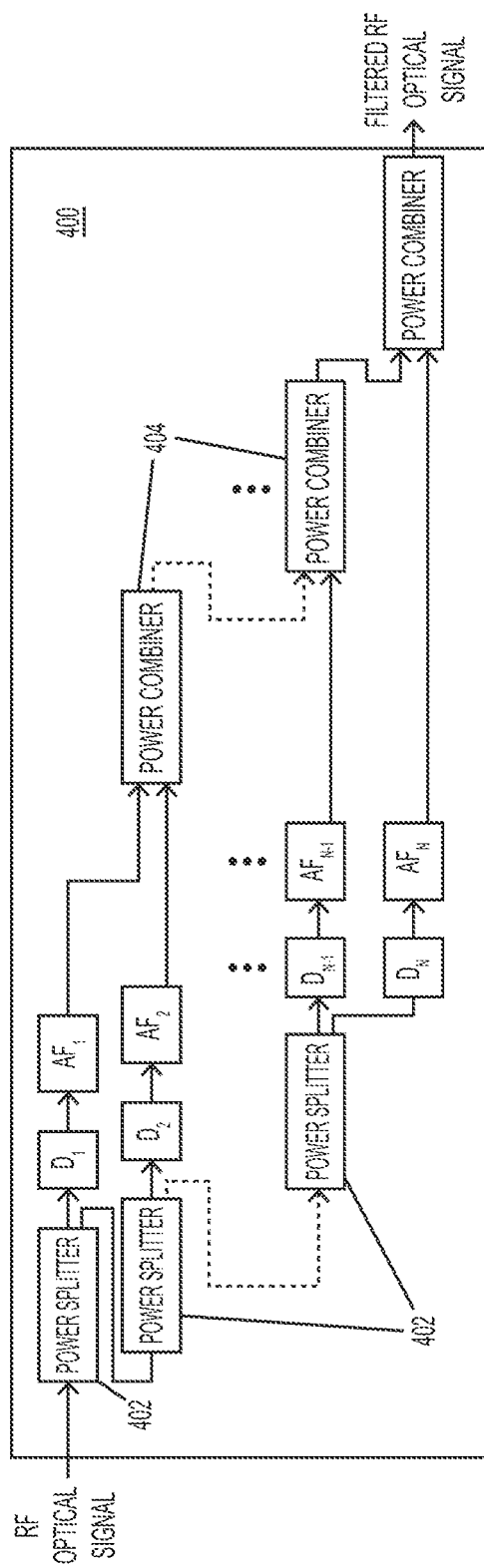
FIG. 4 depicts additional details of the optical FIR filter assembly of the filter circuit shown in FIG. 3.

In practice, however, both the 1×N coupler and the N×1 coupler can be challenging to physically realize. To see why this is so, reference is now made to FIG. 4, which depicts additional details of the optical FIR filter assembly 400. In this example embodiment, the drawing depicts the top half (namely, coupler 312, the delay (D) and gain (AF) elements, and coupler 340 of the optical FIR filter assembly shown in FIG. 3). This stage is implemented in a tree-based configuration on the PIC. As depicted, the input RF optical signal is split into multiple taps using adjustable power splitters 402, with the output of splitter feeding the input to another. Each tap passes thru a delay (D) and gain (AF) element, the taps are combined in pairs by a power combiner 404, with the output of a particular power combiner feeding to another, etc. As noted above, this structural configuration is difficult to realize. In particular, when the taps are combined (by the power combiner elements) energy is lost due to destructive interference due to the phase difference between the combining waveguide. Although the lengths of the waveguides are known, it is not possible to accurately predict these phases and force a coherent combination as the gain stage changes the phase of the signal based on the gain. As a result, this topology results in significant lost power, and it is not readily physically realizable.

Figure 5:
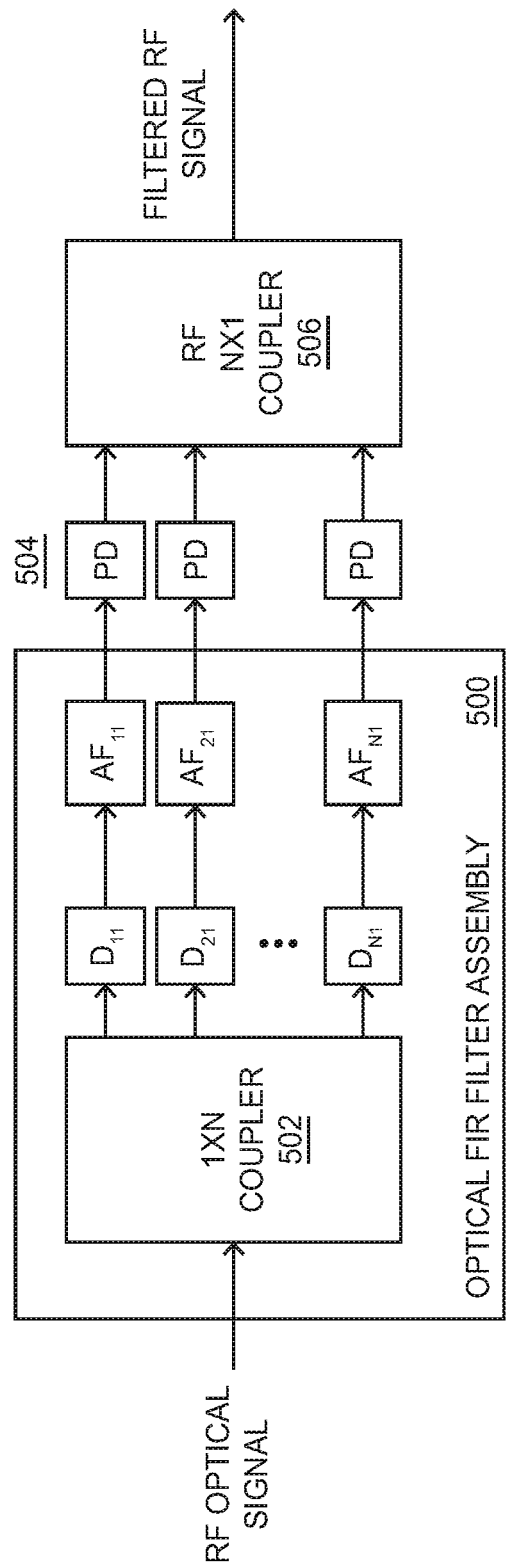
FIG. 5 depicts an optical FIR filter and associated photodetector arrangement wherein waveguide outputs are combined off-chip.

One possible approach to address this problem is depicted in FIG. 5. In this example, the optical FIR filter assembly 500 comprises the 1×N coupler 502 and the plurality of delay (D) and gain (AF) elements as before, but in this case the outputs are taken off the PIC into multiple photodetector (PD) elements 504. The outputs of elements 504 are then combined off-PIC and in the RF domain by the N×1 coupler 506. This approach, however, is difficult to implement from a chip packaging and assembly standpoint. Moreover, the approach requires significant added complexity and cost, and is less reliable that performing the combining on-chip, in part because the RF combiners typically contribute significant signal loss.

Optical circuits having waveguide arrays can provide different modes of light transmission. These include single mode, multi-mode and super-mode. In single mode, an individual waveguide supports just one mode of propagation. In multi-mode, an individual waveguide supports more than one mode of propagation. Super-mode refers to a guided mode that exists between multiple discrete waveguides that are configured in single or multi-mode.

Figure 6:
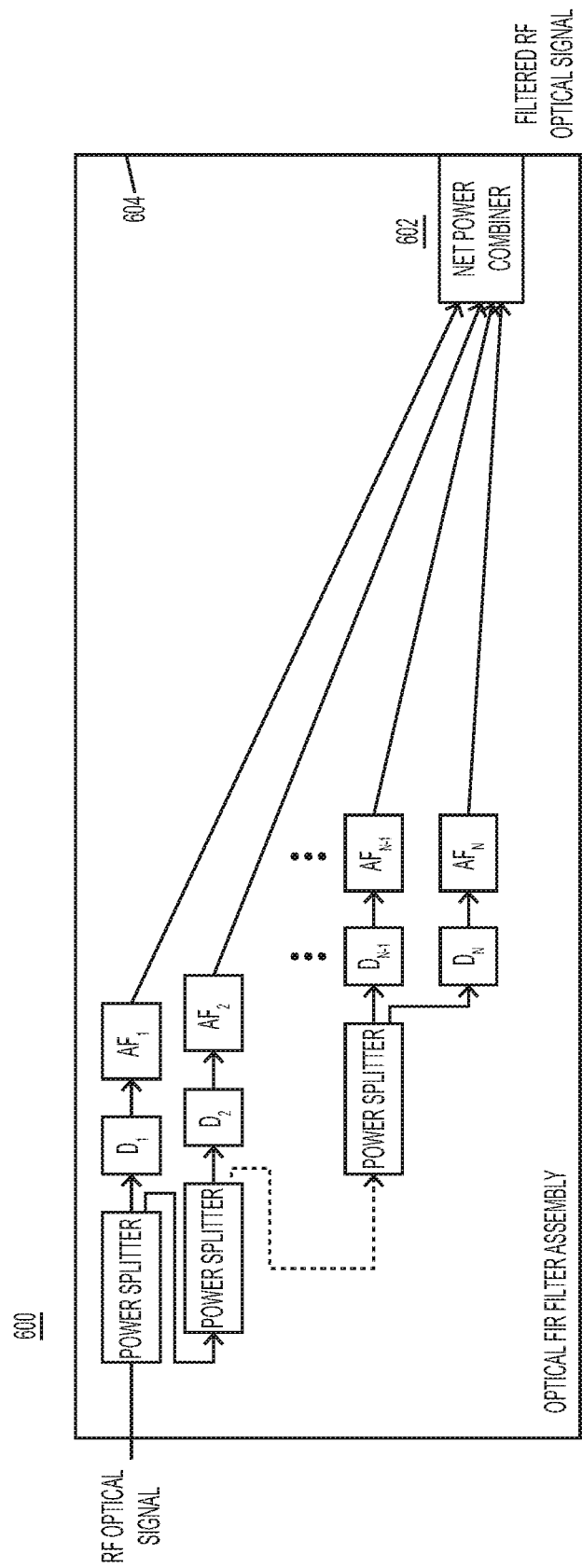
FIG. 6 depicts a representation of a photonic integrated circuit that is configured with an optical FIR filter assembly, and a set of converging waveguides according to the techniques of this disclosure.
Figure 7:
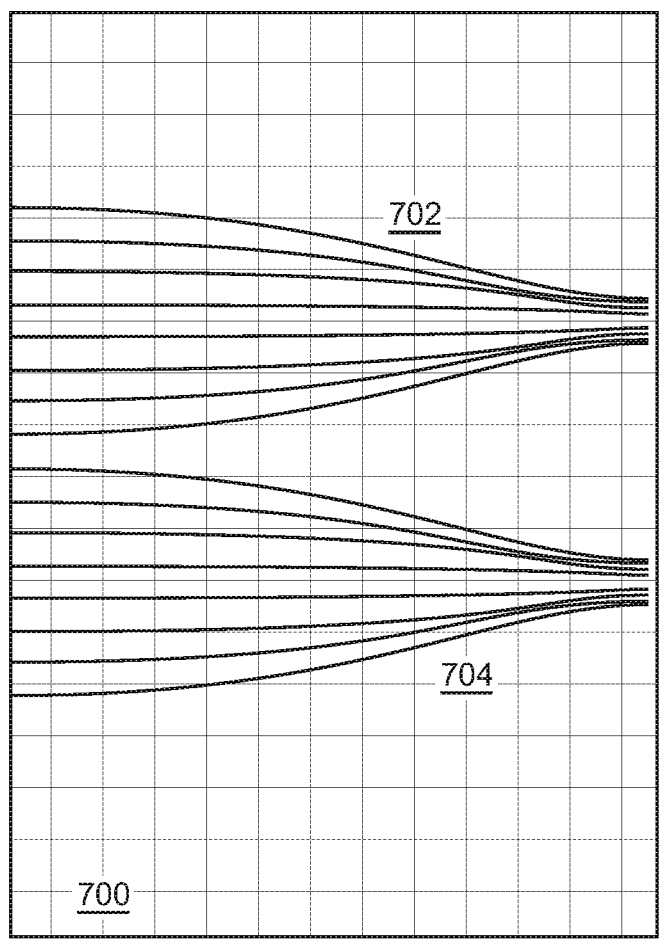
FIG. 7 depicts a Focus Integrated Combined Output (FICO) apparatus of this disclosure comprising converging waveguides that enables efficient transfer to an associated photodetector for off-chip conversion to the RF domain.

According to the approach herein, and in lieu of taking waveguide outputs off a PIC for conversion to RF and combining in the RF domain (FIG. 4), the waveguides are configured in a waveguide array that provides significant efficiencies, thereby enabling the couplers to be physically-realized on the PIC. As depicted in FIG. 6, a photonic integrated circuit (PIC) 600 is configured with various elements comprising, among others, an optical FIR filter assembly such as depicted in FIG. 3. A waveguide array is fabricated on (e.g., patterned onto, placed on top of, etc.) the integrated photonic chip. In particular, and in this embodiment, the individual waveguides as fabricated are configured to converge very close to one another at an exit 602 of the PIC. The exit 602 preferably is located along an edge 604 of the chip. The particular location of the exit is not a limitation. FIG. 7 depicts this structural arrangement (an array of converged waveguides) in additional detail. This arrangement is sometimes referred to herein as a Focus Integrated Combined Output (FICO) structure or apparatus.

In this example embodiment, the waveguide array comprises two (2) sets of waveguides depicted as being formed on (etched into) the substrate 700 (which may be formed by leveraging conventional patterning techniques), with a first set 702 corresponding to the outputs of the N×1 combiner (e.g., coupler 340 in FIG. 3), and the second set 704 corresponding to the outputs of the other N×1 combiner (e.g., coupler 342 in FIG. 3). Each such set is a FICO structure. As depicted in FIG. 7, which is merely exemplary, FICO structure is two-dimensional (2D), and the respective waveguides therein are positioned with respect to a central axis (of the set), with individual waveguides of the set tapered such that the waveguide outlets (for the set) converge very close to one another at the exit of the chip. There is no requirement that the waveguides be centered about a particular central axis; in an alternative 2D arrangement the waveguides forming the FICO structure may be co-planar but offset (e.g., slanted) relative to a particular plane of the chip. The FICO structure also may be configured in three-dimensions (3D), as further explained below, or as a consequence of individual waveguides being merely offset from one another (i.e., not co-planar) along some portions thereof.

Thus, according to this disclosure, at least a first waveguide in a set of waveguides is patterned on the optical circuit at least in part in a converging configuration such that, relative to at least one second waveguide in the set, the resulting outlets of the first and second waveguides are spaced in a manner to facilitate the generation or inhibition (from the array) of intermodulation products and/or harmonics. Preferably, the first and second waveguides are configured relative to one another such that light entering both waveguides (even at the same polarization) propagates through portions of the waveguides that are positioned sufficiently adjacent to one another (and that then typically terminate along a same PIC facet); this type of propagation (across nearby portions of the waveguides) is sometimes referred to herein as co-propagation and can excite a super-mode between the waveguides. In a typical case, co-propagation occurs over a length or extent of the adjacent waveguide portions, and the amount of such co-propagation (e.g., corresponding to the common length portions) then determines a degree to which intermodulation products and/or 'are created or limited. The adjacent waveguide portions are sometimes referred to herein as a co-propagation region.

Figure 8:
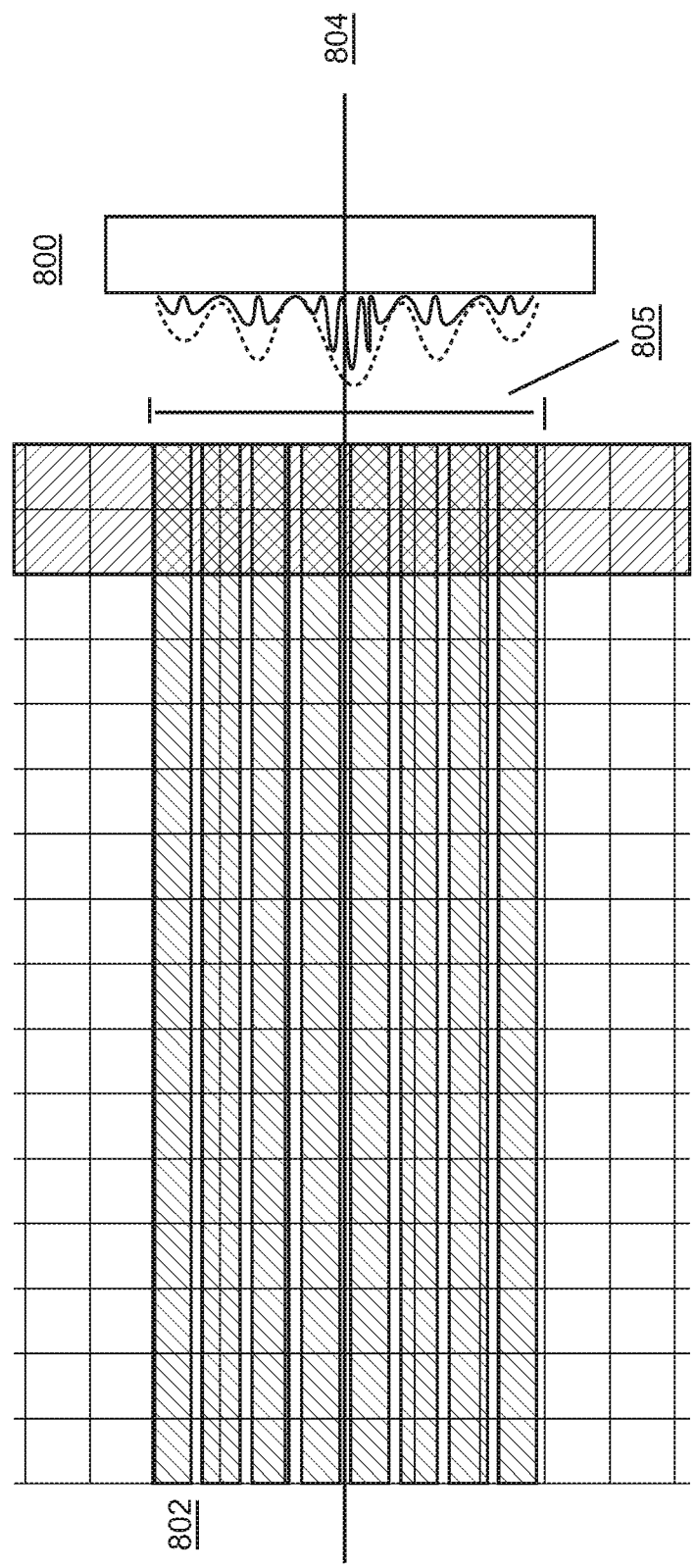
FIG. 8 depicts the FICO apparatus and an associated photodetector in additional detail, illustrating how constructive and destructive fringes are captured and converted to the RF domain by the photodetector, all without losing optical power.

As a concrete example, FIG. 7 depicts a FICO structure with relatively limited overlap of the converged waveguide sections before the termination along the common facet; in this example, the intermodulation products are relatively limited/restricted. On the other hand, and as depicted in FIG. 8 (described below), when the converged waveguide elements are co-extensive over a much longer extent (and thus have a longer co-propagation region), more intermodulation products are generated.

As these examples evidence, the amount and nature of the intermodulation products can thus be selectively tuned by adjusting the structural arrangement of the converged waveguide(s) that, typically, terminate at the same PIC facet. Stated another way, and given first and second waveguides (with one converging toward the other at least in part), the light enters both waveguide inlets, and it transits the waveguides. Due to the converging structure, the light also co-propagates along the portions of the first and second waveguides that lead to the terminus, thereby creating/inhibiting intermodulation products and/or harmonics as a function of the co-propagation (typically, length); the light, having now passed through both waveguides, then terminates from the array at the common facet. The nature and extent of the intermodulation products or harmonics produced by the waveguides thus are tunable by controlling the co-propagation length. In an alternative, co-propagation may be impacted by other structural arrangements or relationships of the waveguide portions (e.g., orientation, size, shape, input phase of the optical signal input to the respective guides, etc.)

In addition, the properties of the co-propagation region and thus the intermodulation products or harmonics generated or inhibited may change due to environmental factors, such as temperature, pressure, stress, vibration and the presence of gasses or other substances. In one example scenario, one or more of the following factors thus may be engineered to generate a desired output from the FICO device: length of co-propagation, phase of one or more individual waveguides, intensity of one or more of the individual waveguides, temperature of the system or device (which in effect alters co-propagation length), properties of the waveguides and separation material (which may be altered during fabrication using temperature or temperature gradients). More generally, if the impact of such factors are known or ascertainable (and controllable), it is within the scope of this disclosure to tune the co-propagation region further to take advantage of one or more such factors.

The above-described structural arrangement (e.g., the co-propagation region) facilitates the focused integration of the waveguide outputs, hence the FICO name. As a skilled person will appreciate, the generation or inhibition of inter-modulation products and/or harmonics, as the case may be, each represent different forms of distortion of the modulated signal produced by the FICO structure.

In the example embodiment in FIG. 7, the resulting waveguide of the FICO structure has an aperture that is sized to be close to the size of the photodetector. In particular, FIG. 8 depicts in detail one of the sets at the very edge of the chip, as well as a photodetector (PD) 800, which is positioned off-chip but nearby (adjacent to the edge). As shown, the aperture 805 of the resulting waveguide (comprising the apertures of the individual waveguide elements 802 converged around the central axis 804) is close to the size of the PD. Thus, in this arrangement, a FICO structure (such as first set 702, or second set 704 in FIG. 7) comprising a set of waveguides having individual apertures and that are configured so as to act as a single, larger, aperture. As configured, and as depicted on FIG. 8, in the typical use case, the individual waveguide outputs from the set are combined on the photodetector 800.

Although FIG. 8 depicts the FICO structure as having an aperture that is close to the size of the photodetector, this is not a requirement. The aperture of the waveguide array may be smaller (or even larger) than the size of the photodetector without departing from the principles of this disclosure. Generalizing, the positioning of the photodetector relative to the chip edge, and the size of waveguide array aperture relative to the photodetector size, may vary depending on the desired application or use case.

The above-described structural arrangement provides significant advantages. In particular, the approach allows all of the energy from the individual waveguides to be transferred to the PD, which energy is then converted to the RF domain for further processing (in this embodiment). In particular, and by sizing the aperture close to that of the PD, constructive and destructive fringes are captured and converted, thereby avoiding optical power (interference-related) losses.

Figure 14:
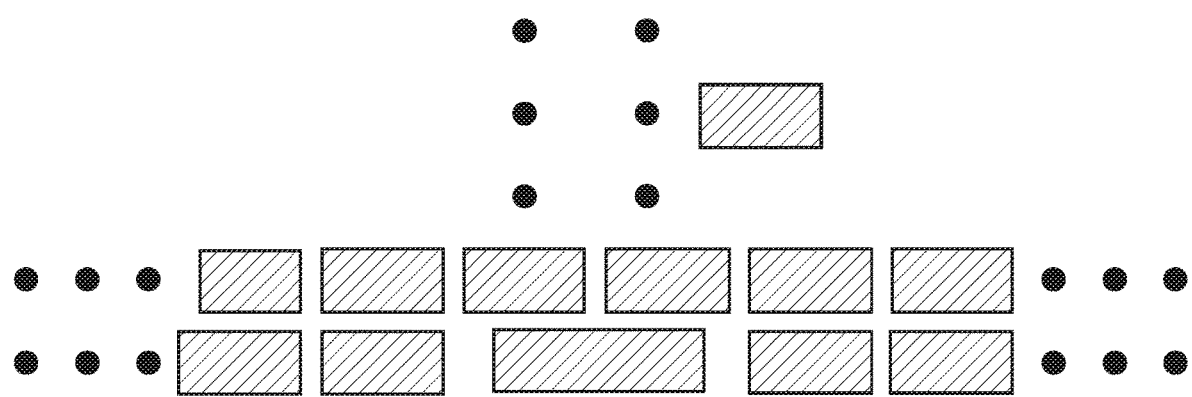
FIG. 14 depicts a representation of a FICO structure having three-dimensional (3D) waveguide array according to another embodiment.

Although the waveguide array is depicted in FIGS. 7 and 8 as being two (2)-dimensional, this is not a limitation, as three (3)-dimensional (3D) structures may also be utilized. Thus, in general there is no requirement that the waveguides comprising the FICO structure be fabricated in the same plane of the chip. A representation of a 3D waveguide structure is shown in FIG. 14. A three-dimensional (3D) FICO structure of this type allows for the creation of multiple modes ("multi-mode") simultaneously, as well as the coupling of such multiple modes (e.g., with multiple information signals) into a waveguide/PIC/optical fiber. As depicted in FIG. 14, the waveguides in the 3D structure may have different sizes, shapes, and orientation relative to one another. A 3D structure of this type also enables creation of a phased array optical interface, thereby allowing beam steering and efficient coupling to diverse targets.

Figure 9A:
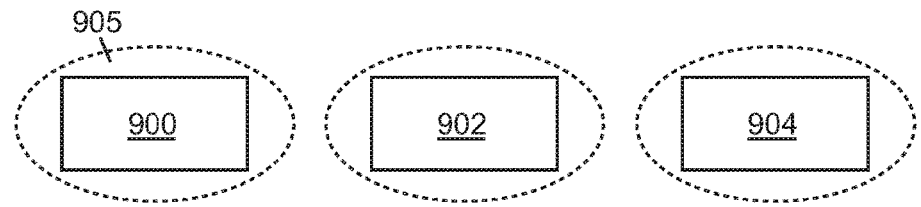
FIG. 9A depicts a prior art waveguide array configuration.
Figure 9B:
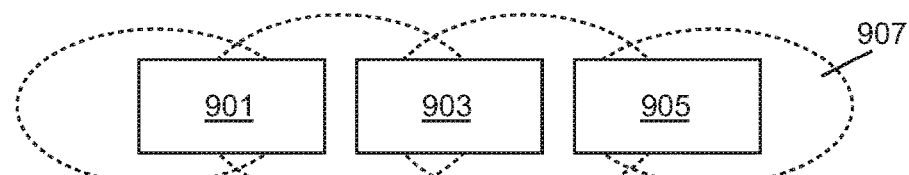
FIG. 9B depicts a waveguide array configuration of this disclosure in one embodiment.
Figure 9C:
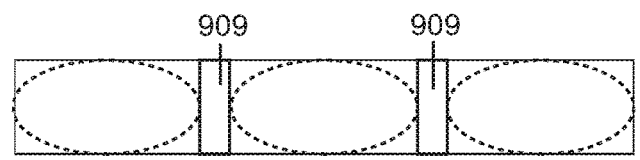
FIG. 9C depicts a variant of the waveguide array configuration of FIG. 9B that further includes isolation components to limit intermodulation products.

Referring now to FIGS. 9A-9C, the mode of transmission that is enabled by the structural arrangement of the converged waveguides in the waveguide array is now shown and compared to the prior art. FIG. 9A, which depicts the prior art, shows a conventional transmission mode for the waveguides 900, 902 and 904. As can be seen, in this arrangement the photons 905 in a particular waveguide (e.g., waveguide 900) do not interact with the photons in an adjacent waveguide (e.g., 902) due to the physical separation of the waveguides in the array. In FIG. 9B, however, and in contrast to the arrangement shown in FIG. 9A, the waveguides 901, 903 and 905 are configured in the converged manner previously described and thus are closely packed with respect to one-another; in this arrangement, the photons instead interact across the closely-spaced waveguides to form a super-mode 907 of transmission that encompasses the waveguides in the set. The photons from the individual waveguides, however, do not interfere with one another. In a variant embodiment, as depicted in FIG. 9C, individual waveguides in the set may be isolated from one another, and thereby limiting generation of intermodulation products, e.g., by interposing an isolation trench (e.g., 909) between individual waveguides. The isolation trench may comprise any suitable material having a low refractive index. In one example, the trench may comprise an air trench. Isolating individual waveguides in this manner is not required, but this structural arrangement may be useful when intermodulation products are desired to be limited.

Generalizing, the FICO apparatus of this disclosure comprises an array of waveguides patterned onto a PIC. The array comprises individual waveguides, each of which receive light inputs, e.g., individual taps of a multi-tap optical filter used in an interference cancellation circuit. Each individual waveguide comprises an inlet, and an outlet; typically, the output(s) of the individual waveguides are located at an exit (edge) of the PIC. Typically, the waveguide array as structured is configured along an axis passing through a first waveguide. According to this disclosure, at least one second waveguide in the array is patterned on the PIC in a tapered configuration such that, relative to the first waveguide, the outlet(s) of the first and second waveguides are positioned to be closer to one another as compared to the inlet(s) of these waveguides. This structural configuration enables the generation of the super-mode of transmission at the PIC exit, enabling more efficient transfer of the energy, e.g., to an associated PD that provides conversion of the energy to the RF domain.

Figure 10:
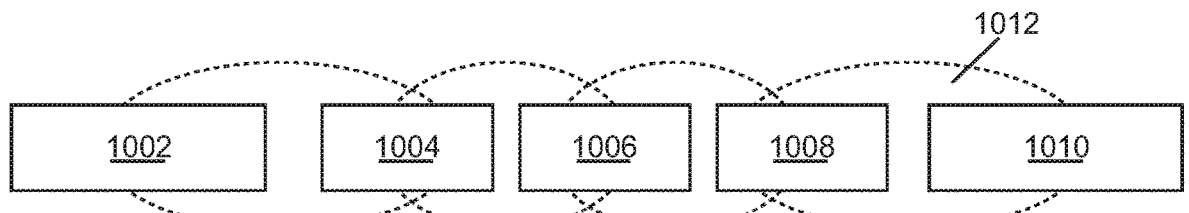
FIG. 10 depicts another variant waveguide array configuration that includes waveguide sizes and locations engineered to control an output mode and/or divergence angle of the overall waveguide output from the FICO structure of this disclosure.

Further, it is not required that the individual waveguides in the waveguide array set have the same physical structure (namely, width, length, etc.). Referring now to FIG. 10, the output mode and divergence angle of the composite waveguide output may be varied by engineering the size and shape of individual waveguides in the FICO structure. This allows optimization of the number of taps at the exit, the size of the photodetector, and the distance of the photodetector from the PIC edge. Thus, in the example arrangement shown in FIG. 10, the waveguide array for the FICO structure comprises waveguides 1002, 1004, 1006, 1008 and 1010. As depicted, the waveguides 1004, 1006 and 1008 have smaller widths than waveguides 1002 and 1010. In this arrangement, the resulting mode 1012 is narrower than the overall width of all the waveguides taken together, thereby allowing for more taps or a smaller photodetector. Output modes that are engineered in this way, e.g., by adjusting the relative sizes and spacing of the waveguides, is very desirable as it enables effective (efficient) coupling of the FICO structure output to other waveguides/PICs/optical fiber. The approach provides production efficiencies as the transmission mode may also be changed post-fabrication.

Generalizing, the number of waveguides (taps) in the FICO structure may vary, as can their shape(s) and relative spacing. Where desirable, and as also described, waveguides may be further separated by isolation elements to limit intermodulation products. Further, individual waveguides may include associated phase shifter elements at their leading ends (i.e. their inlets) for further signal-shaping.

Figure 11:
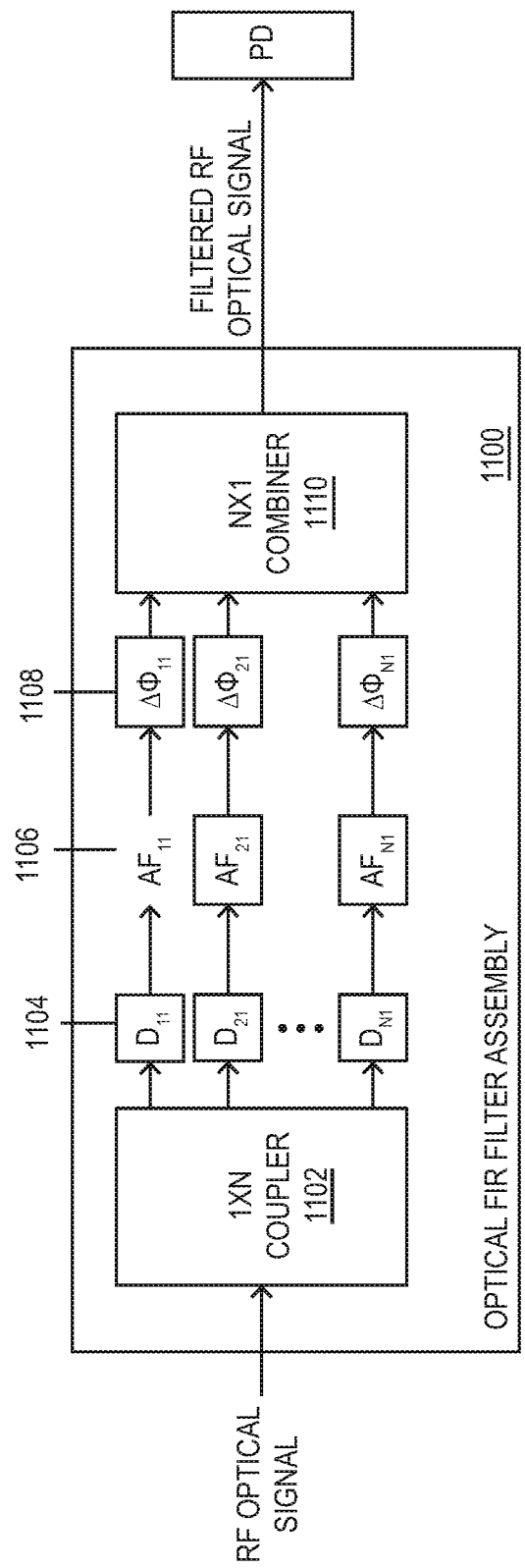
FIG. 11 depicts a further variant embodiment wherein phase shifter elements are positioned before one or more of the waveguide elements in the FICO structure to enable engineering of the mode of light as it transitions through the structure.

In accordance with another variant embodiment, a phase shifter is associated with one or more of the individual waveguides that are patterned on the PIC. The phase shifter(s) preferably are located at a front end of the waveguide array (the FICO structure), which in FIG. 8 (for example) is the location to the left of the array. Inclusion of phase shifters in this manner enables the mode of light to be further engineered as it transitions through the waveguide array structure. An exemplary arrangement is depicted in the block diagram shown in FIG. 11. In this example, the optical FIR filter assembly 1100 comprises the 1×N coupler 1102, delay elements 1104, gain elements 1106, and the N×1 combiner 1110 that comprises the waveguide array structure configured to combine the multiple paths of light as previously described. As also depicted in FIG. 11, and in this variant embodiment, a set of phase shifters 1108 also are configured on the chip, with each phase shifter 1108 element located in front of a respective waveguide in the array that forms the combiner 1110. In this example, there is a phase shifter configured in front of each waveguide, although this is not a requirement.

While the FICO structure provides significant advantages when used as an optical filter in association with a photodetector as previously described, this is not a limitation. The following describes various use cases that benefit from this subject matter.

In one example, the output provided by the converged waveguides in the FICO structure are coupled as an input to another photonic chip in lieu of being converted to the RF domain for further processing. In this arrangement, the photodetector is not used.

In another example, the FICO structure facilitates creation of a phased array optical interface, allowing beam steering and efficient coupling to diverse targets.

Figure 12:
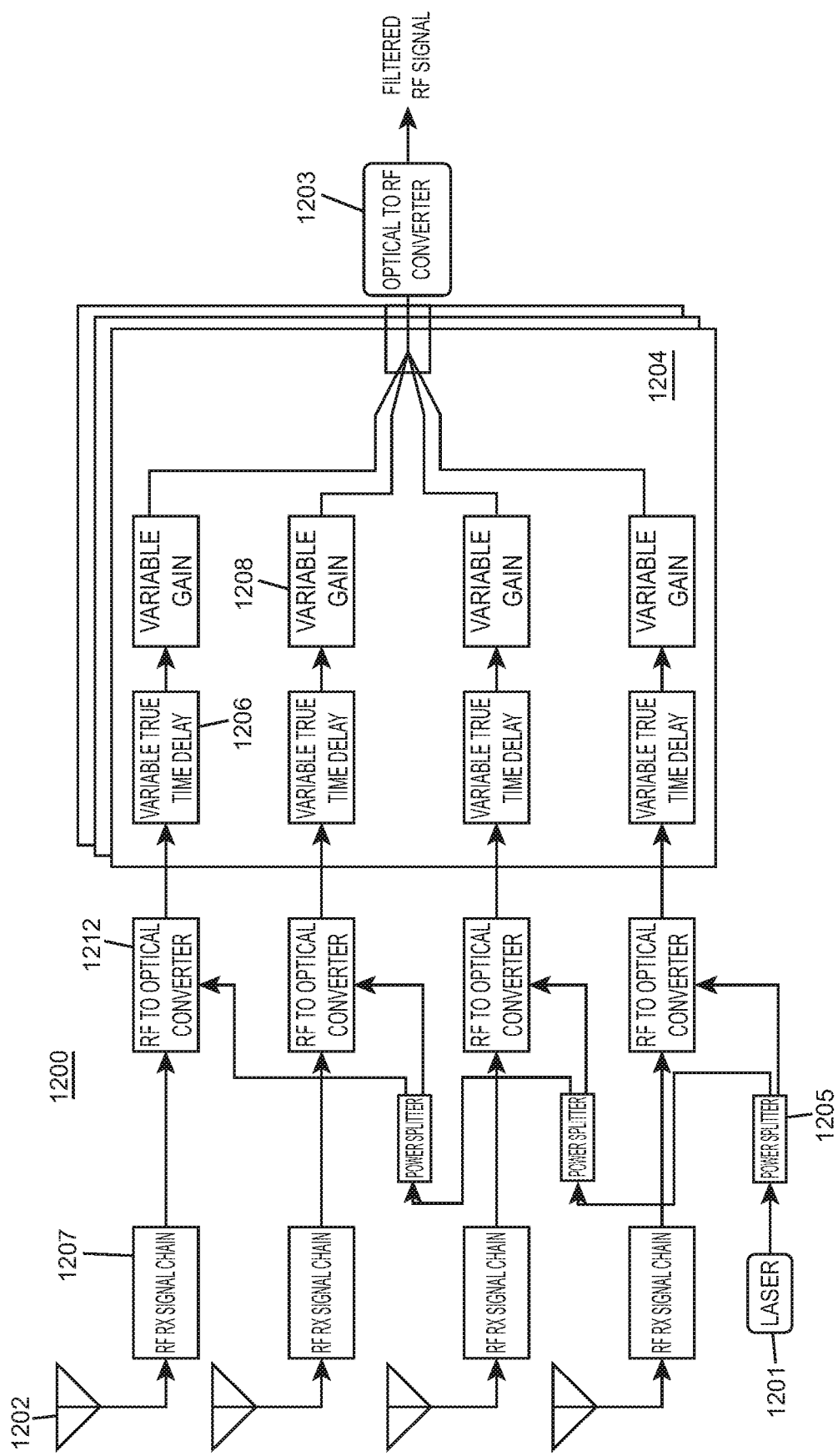
FIG. 12 depicts a phased array antenna receiver that includes a PIC having a FICO structure of this disclosure.

In still another variant, depicted in FIG. 12, the FICO structure is used in a phased array antenna receiver 1200. As shown, the receiver only requires use of a single laser 1201, and a single photodetector (PD) 1203. As depicted, the output of the laser 1201 is split by a plurality of power splitters 1205. The phased array antenna receiver 1200 comprises multiple receive antennas 1202, with the signal output from each antenna then being processed through a processing leg that includes an RF receive signal chain 1207. In this configuration, the signals from the multiple receive antennas 1202 are modulated onto an optical carrier, using an RF-to-optical converter or modulator 1212 in each leg. The optical versions of the receive signals are coupled onto a PIC 1204 where each goes through a variable delay 1206 stage and variable gain/attenuation stage 1208. The signals from each leg are then combined using a FICO structure 1210 as they exit the PIC and are converter back to the RF domain by the PD 1203. A phased array may have as few as two elements (antennas) or as many as n elements. In another variant of this configuration, it may be desirable to support multiple filtered signals (e.g., corresponding to multiple spatial beams), and this can be accomplished by using multiple layers of the PIC filter or by modulating the received signal onto multiple wavelengths of light.

In a phased array antenna of this type, it is important to accurately adjust the phase/delay of multiple received signals from multiple antennas to reconstruct a given spatial beam. Using a PIC, high-fidelity switched, true time delay lines are implemented, and these variable delays are used to accurately reconstruct a given spatial beam. The FICO structure facilitates recombining the signals to recover the spatial beam, as well as to facilitate efficient coupling to the photodetector efficient optical-to-electrical conversion.

Figure 13:
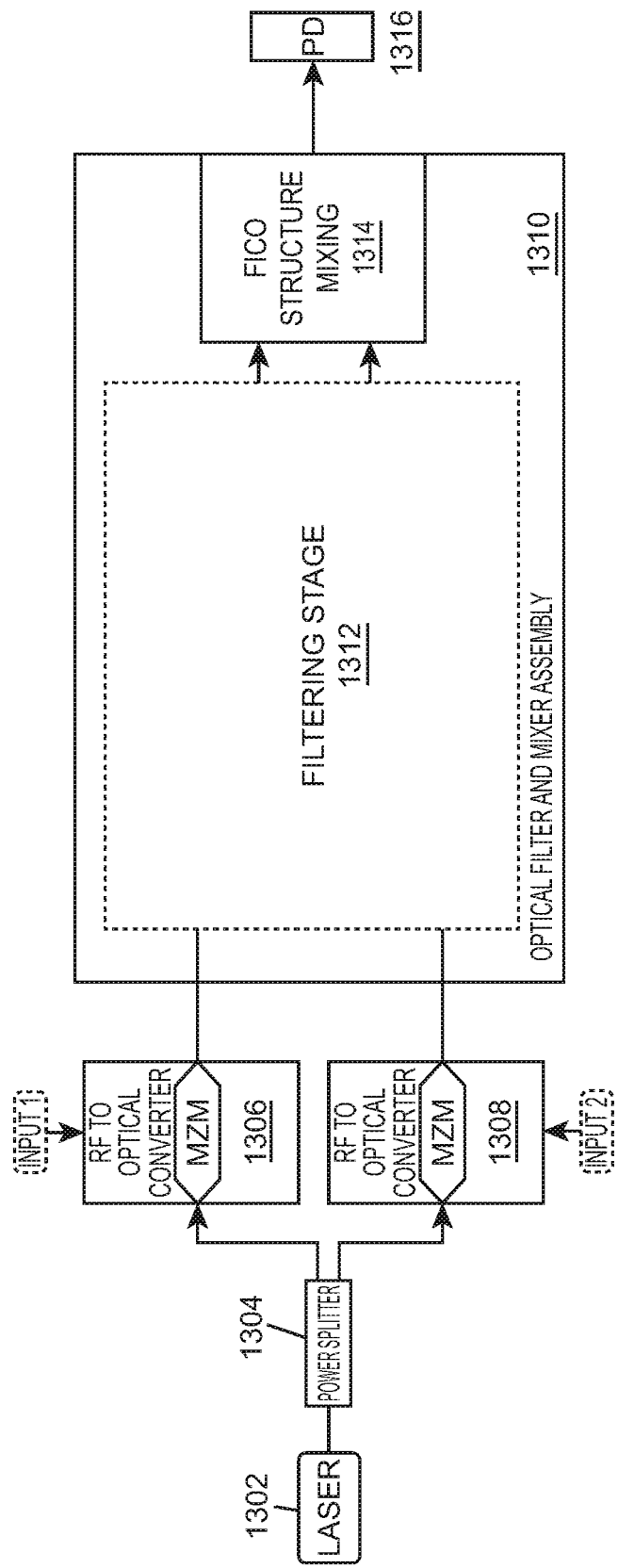
FIG. 13 depicts a RF mixer that includes a PIC having a FICO structure of this disclosure.

FIG. 13 depicts another use case, an RF mixer using a PIC that incorporates the FICO structure described herein. In this example, a laser 1302 output is provided to a power splitter 1304, which in turn drives a pair of RF-to-optical converters 1306 and 1308. The converters output optical signals to an optical filter and mixer assembly 1310 patterned on the PIC. The assembly 1310 comprises a filtering stage 1312, and the FICO structure 1314, with the latter used to mix the filtered signals provided by the filtering stage 1312. The filtered signal is converted back to the RF domain using a PD 1316.

Enabling Technologies

The FICO apparatus of this disclosure is configured to be fabricated on a photonic integrated circuit. Generalizing, a PIC (or, more generally, an integrated optical circuit) is a device that integrates a plurality of photonic functions, typically functions for information signals imposed on optical wavelengths typically in the visible spectrum or near infrared 850 nm-1650 nm. Several of these functions have been described herein by way of example, but these examples are not intended to be limiting. Photonic integrated circuits are fabricated from a variety of material systems, including electro-optic crystals such as lithium niobate, silica on silicon, Silicon on insulator, as well as various polymers and semiconductor materials. According to this disclosure, a photonic integrated circuit is configured to include at least one FICO apparatus configured as has been described and depicted.

The description above concerning a waveguide "inlet" or "outlet" is not intended to be limiting. Depending on the use case, a particular inlet of a waveguide may function as an outlet, or vice versa.

What is claimed is:

1. A waveguide structure for optically coupling a first tap output of an optical filter assembly to a photodetector and a second tap output of the optical filter assembly to the photodetector, the waveguide structure comprising:
   a substrate defined by a length;
   a first optical waveguide disposed at least partially on the substrate and comprising:
      a first inlet optically coupled to the first tap output;
      a first linear region extending at least partially across the length of the substrate; and
      a first transition region optically coupling the first linear region to a common output optically coupled to the photodetector; and
   a second optical waveguide disposed at least partially on the substrate and comprising:
      a second inlet optically coupled to the second tap output;
      a second linear region extending at least partially across the length of the substrate parallel to the first linear region of the first optical waveguide; and
      a second transition region converging toward the first transition region, the second optical waveguide optically coupling the second linear region to the common output;
   wherein:
      a distance separating the first optical waveguide from the second optical waveguide at a location along the length of the substrate facilitates a supermode of photons traversing the first optical waveguide and a supermode of photons traversing the second optical waveguide.

2. The waveguide structure of claim 1, wherein the first optical waveguide is formed at least partially onto the substrate.

3. The waveguide structure of claim 1, further comprising an isolation trench separating at least a portion of the first optical waveguide from at least a portion of the second optical waveguide.

4. The waveguide structure of claim 3, wherein the isolation trench is formed from a material having a low refractive index.

5. The waveguide structure of claim 4, wherein the isolation trench is an air trench.

6. The waveguide structure of claim 1, wherein the location is within the first transition region.

7. The waveguide structure of claim 1, wherein the second transition region overlaps at least a portion of the first linear region along the length of the substrate.

8. The waveguide structure of claim 1, wherein the substrate forms at least a portion of a photonic integrated circuit.

9. The waveguide structure of claim 1, wherein the first optical waveguide is coplanar with the second optical waveguide across the length of the substrate.

10. An on-chip structure for optically coupling an array of optical outputs of an optical filter assembly to a photodetector, the on-chip structure comprising:
   a set of optical waveguides comprising:
      a set of inlets physically separated from one another, each inlet optically coupled to a respective one optical output of the optical filter assembly; and
      a common outlet, the common outlet optically coupled to each inlet of the set of inlets, the common output optically coupled to the photodetector; wherein:
   a first optical waveguide of the set of optical waveguides has a first rectangular cross-sectional shape and a second optical waveguide of the set of optical waveguides has a second rectangular cross-sectional shape.

11. The on-chip structure of claim 10, wherein each optical waveguide of the set of optical waveguides has a rectangular cross-sectional shape.

12. The on-chip structure of claim 10, wherein the first rectangular cross-sectional shape is different from the second rectangular cross-sectional shape.

13. The on-chip structure of claim 10, further comprising a set of isolation trenches disposed between each of the set of optical waveguides.

14. The on-chip structure of claim 10, wherein the set of optical waveguides are formed onto a substrate of a photonics integrated circuit.

15. An on-chip structure for optical coupling, the on-chip structure comprising:
   a substrate defined by a first length; and
   a first optical waveguide defining a first inlet and defined by a second length;
   a second optical waveguide defining a second inlet and defined by a third length; and
   a common output optically coupled to each of the first inlet and the second inlet;
   wherein:
   the first length is less than the second length and the second length is less than the third length; and
   a distance separating the first optical waveguide and the second optical waveguide at a location along the length of the substrate facilitates a supermode of photons traversing the first optical.

16. The on-chip structure of claim 15, wherein the first inlet and the second inlet are separated by a distance.

17. The on-chip structure of claim 15, wherein at least a portion of the first optical waveguide is optically isolated from the second optical waveguide.

18. The on-chip structure of claim 15, wherein the common output is optically coupled to a photodetector.

* * * * *